United States Patent
Reeves et al.

(10) Patent No.: US 7,016,213 B2
(45) Date of Patent: Mar. 21, 2006

(54) METHOD FOR INITIALIZING A SYSTEM INCLUDING A HOST AND PLURALITY OF MEMORY MODULES CONNECTED VIA A SERIAL MEMORY INTERCONNECT

(75) Inventors: Richard W. Reeves, Westboro, MA (US); Ross V. La Fetra, Sunnyvale, CA (US); Paul C. Miranda, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 157 days.

(21) Appl. No.: 10/842,297

(22) Filed: May 10, 2004

(65) Prior Publication Data

US 2005/0162882 A1     Jul. 28, 2005

Related U.S. Application Data

(60) Provisional application No. 60/470,078, filed on May 13, 2003.

(51) Int. Cl.
*G11C 5/06* (2006.01)
(52) U.S. Cl. .................. 365/63; 365/233; 710/22
(58) Field of Classification Search .......... 365/63, 365/233, 185.03, 195, 226; 710/22
See application file for complete search history.

(56) References Cited

U.S. PATENT DOCUMENTS

6,781,911 B1 * 8/2004 Riesenman et al. .......... 365/226
2003/0179777 A1 * 9/2003 Denton et al. .............. 370/503

* cited by examiner

*Primary Examiner*—Van Thu Nguyen
*Assistant Examiner*—Dang T. Nguyen
(74) *Attorney, Agent, or Firm*—Ingrassia Fisher & Lorenz, P.C.

(57) ABSTRACT

A host is coupled to a serially connected chain of memory modules. In one embodiment, a method for initializing the host and each of memory modules includes the host transmitting a first synchronization pattern and a second synchronization pattern downstream in response to a reset condition. The method also includes each memory module in the serially connected chain of memory modules receiving and forwarding the first and the second synchronization pattern. Each memory module receives and forwards the first and the second synchronization pattern. Further, the method includes the host transmitting a plurality of NOP packets downstream in response to transmitting the second synchronization pattern. Lastly, the method includes a portion of the memory modules injecting and transmitting NOP packets upstream in response to receiving the second synchronization pattern from downstream.

22 Claims, 6 Drawing Sheets

METHOD FOR INITIALIZING A SYSTEM INCLUDING A HOST AND PLURALITY OF MEMORY MODULES CONNECTED VIA A SERIAL MEMORY INTERCONNECT

This application claims the benefit of U.S. Provisional Application No. 60/470,078 filed May 13, 2003.

BACKGROUND OF THE INVENTION

1. Field of the Invention

This invention relates to computer system memory and, more particularly, to memory module configurations and the memory subsystem topology.

2. Description of the Related Art

Many computer systems employ a main system memory that may be configured dependent upon the needs of an end user. In such systems, a motherboard or system board may include a number of memory expansion sockets. One or more small circuit boards, referred to as memory modules, may be inserted into the sockets as needed to increase the memory capacity of the computer system. Each of the memory modules typically includes multiple memory devices that provide a given amount of memory capacity. The memory devices are usually implemented using some type of dynamic random access memory (DRAM). Some examples of DRAM types include synchronous DRAM (SDRAM) as well as the various types of double data rate SDRAM (DDR SDRAM).

In conventional computer systems, the memory modules are connected to a memory/DRAM controller via a memory bus that includes address, control and a data signals. In some computer systems, the address, control and data signals may be multiplexed and thus share the same sets of wires. In other computer systems, the address, control and data signals may use separate wires. In either case, each of the address and control signals are routed to each expansion socket such that the memory modules, when inserted, are connected in parallel to the memory/DRAM controller. In some systems the memory/DRAM controller may reside on the same integrated circuit (IC) chip as the system processor, while in other systems the memory/DRAM controller may reside in one IC (e.g., a Northbridge) of a chipset.

Although the operating speed of computer system processors continues to increase, the relative performance of the main system memory has not increased at the same rate. This may be due, at least in part, to the incremental improvement in the bandwidth of the memory bus architectures described above.

SUMMARY

Various embodiments of a method for initializing a system including a plurality of serially connected memory modules are disclosed. A host is coupled to a serially connected chain of memory modules. A method is described for initializing the host and each of memory modules prior to communication between them. In one embodiment, the method includes the host transmitting a first synchronization pattern and a second synchronization pattern downstream in response to a reset condition. The method also includes each memory module in the serially connected chain of memory modules receiving and forwarding the first and the second synchronization pattern. Each memory module receives and forwards the first and the second synchronization pattern. Further, the method includes the host transmitting a plurality of NOP packets downstream in response to transmitting the second synchronization pattern. Lastly, the method includes a portion of the memory modules injecting and transmitting NOP packets upstream in response to receiving the second synchronization pattern from downstream.

In one specific implementation, the method includes each of the memory modules locking onto the first and said second synchronization pattern. In another specific implementation, the method includes each memory module initializing internal scrambling and de-scrambling logic using the first and the second synchronization pattern.

In yet another specific implementation, the method includes each memory module enabling scrambling logic prior to transmitting the NOP packets upstream.

Figure 1:
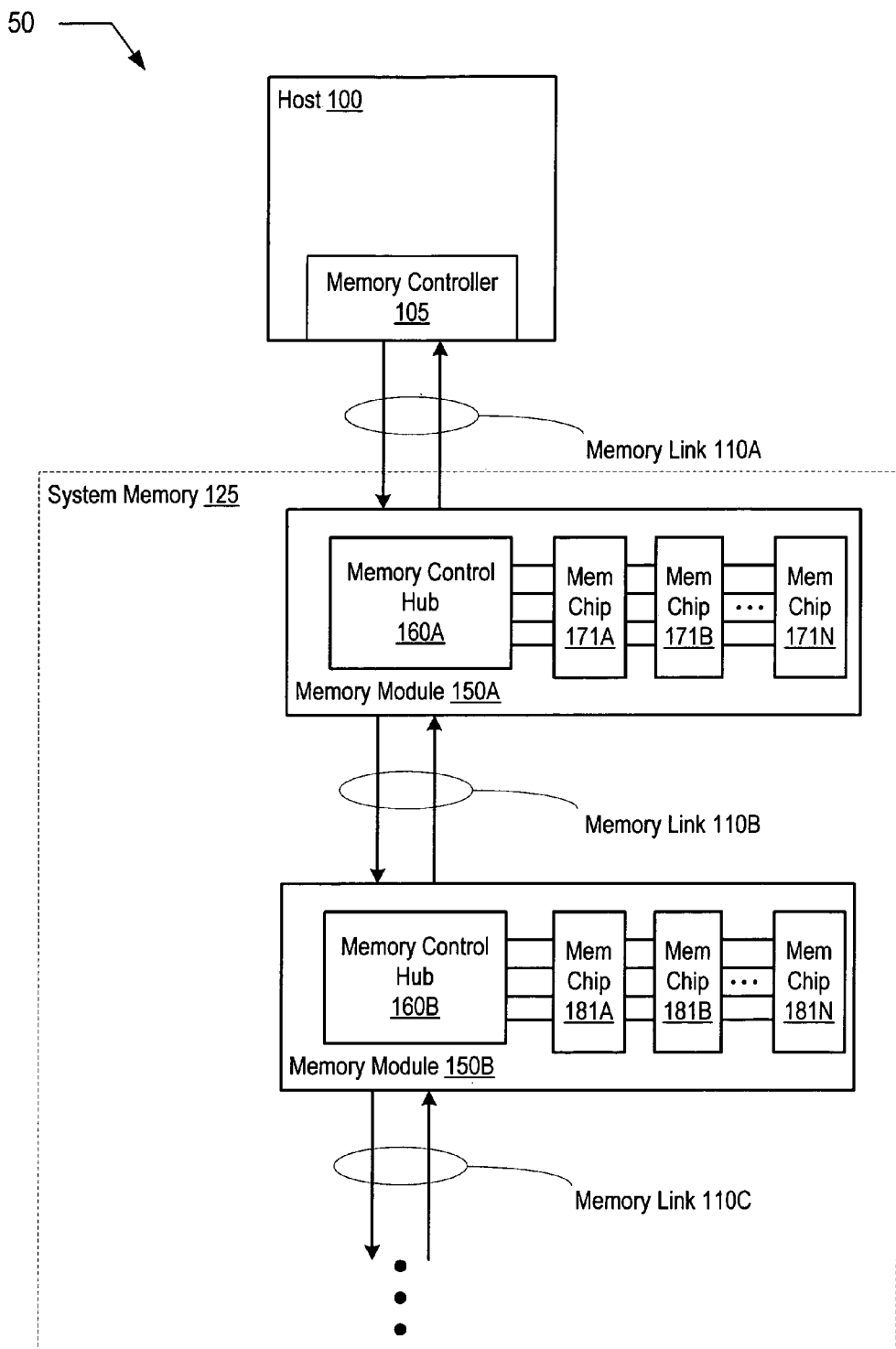
FIG. 1 is a block diagram of one embodiment of a system including a serially connected chain of memory modules.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Turning now to FIG. 1, a block diagram of one embodiment of a system including a serially connected chain of memory modules is shown. System 50 includes a host 100 coupled to a system memory 125 via a memory link 110A. System 50 may be configured to operate as part of a computing device such as a computer system or server system, for example. System memory 125 includes a memory module 150A coupled to a memory module 150B via a memory link 10B. Memory module 150B is shown coupled to a memory link 110, which may be coupled to an additional memory module (not shown) as desired to form a serially connected chain of memory modules that is coupled to host 100. It is noted that although two memory modules are shown in the chain, it is contemplated that one or more memory modules may be connected in this manner. It is further noted that components including a reference number followed by a reference letter may be referred to generally by the reference number alone. For example, when referring generally to all memory modules, reference may be made to memory module 150.

In the illustrated embodiment, memory module 150A includes a memory control hub 160A, which is coupled to a plurality of memory devices that are designated memory chip 171A through 171N, where N may be any number, as desired. In one embodiment, memory control hub 160A may be coupled to the memory chips via any type of memory interconnect. For example, in one embodiment, the memory interconnect may be a typical address, control and data bus configuration.

Similarly, memory module 150B includes a memory control hub 160B, which is coupled to a plurality of memory devices that are designated memory chip 181A through 181N, where N may be any number, as desired. In one embodiment, memory control hub 160B may be coupled to the memory chips via any type of memory interconnect as described above. It is noted that each of memory chips 171A through 171N and 181A through 181N may be any type of memory device such as a memory device in the DRAM family of memory devices, for example.

In the illustrated embodiment, memory links 110A–110C form a memory interconnect. In one embodiment, each of memory links 110A–110C forms a point-to-point memory interconnect that is implemented as two sets of unidirectional lines. One set of unidirectional lines is referred to as a downlink and is configured to convey transactions away from host 100 in a downstream direction. The other set of unidirectional lines is referred to as an uplink and is configured to convey transactions toward host 100 in an upstream direction. In addition, in one embodiment, each set of unidirectional lines may be implemented using a plurality of differential signal pairs. In one embodiment, each memory link 110 includes an 18-bit downlink and a 16-bit uplink, where each bit is a differential signal pair. As will be described in greater detail below in conjunction with the descriptions of FIG. 5A through FIG. 5D, the memory interconnect formed by memory links 110 may be configured to convey packets.

Generally speaking, all transactions from host 100 flow downstream through all memory modules 150 on the downlink and all response transactions flow upstream from the responding memory module 150 through each upstream memory module 150 on the uplink. More particularly, in one embodiment, host 100 may request to retrieve or store data within system memory 125. In response to host 100 making a request, memory controller 105 initiates a corresponding transaction such as a memory read transaction or a memory write transaction, for example. Memory controller 105 transmits the transaction to system memory 125 via memory link 11A. In the illustrated embodiment, the transaction is received by memory control hub 160A of memory module 150A.

In response to receiving the transaction, memory control hub 160A is configured to transmit the received transaction to memory module 150B via memory link 110B without decoding the transaction. This is referred to as forwarding the transaction downstream. Thus, each transaction received on a downlink by a given memory control hub 160 of a given memory module 150 is forwarded to the next memory module 150 in the chain that is coupled to the downlink without decoding the transaction. In one embodiment, decoding of the transaction may occur in parallel with the forwarding of the transaction. In other embodiments, the decoding of the transaction may occur after the transaction has been forwarded. A more detailed description of downstream forwarding function may be found below in the description of FIG. 3.

Likewise, if memory controller 105 initiates a read request transaction, for example, the memory module 150 having the memory location corresponding to the address in the request will respond with the requested data. The response will be transmitted on the memory module's uplink toward host 100. If there are any intervening memory modules between the sending memory module and host 100, the intervening memory module will forward the response transaction on its uplink to either host 100 or the next memory module in the chain in an upstream direction. In addition, when the responding memory module is ready to send the response, it may inject the response into a sequence of transactions that are being forwarded upstream on the uplink. A more detailed description of upstream forwarding function may be found below in the description of FIG. 5.

In one embodiment, memory controller 105 may be configured to make requests to system memory 125 without knowledge of which of memory modules 150A and 150B a particular address is associated. For example, each of memory modules 150 may be assigned a range of memory addresses during a system configuration sequence. Each memory control hub 160 may include logic (not shown in FIG. 1) that may decode the address of an incoming request. Thus, a memory control hub 160 of a given memory module 150 may initiate a memory read cycle or memory write cycle to the memory chips on the given memory module 150 in response to decoding a memory request having an address that is in the address range assigned to the given memory module 150. As will be described in greater detail below in conjunction with the description of FIG. 2, in one embodiment, each memory control hub 160 may include a DRAM controller (not shown in FIG. 1) for initiating memory cycles to the memory chips to which it is connected.

In addition, in one embodiment, memory controller 105 may initiate a subsequent memory access request prior to receiving a response to a previous memory access request. In such an embodiment, memory controller 105 may keep track of outstanding requests and may thus process the responses in a different order than they were sent.

It is noted that in an alternative embodiment, each of memory links 110 may form a point-to-point memory interconnect that is implemented as one set of bi-directional lines. As such, transactions may flow both upstream and downstream on the set of bi-directional wires. In such an embodiment, the bi-directional lines may be implemented using a plurality of differential signal pairs.

Figure 2:
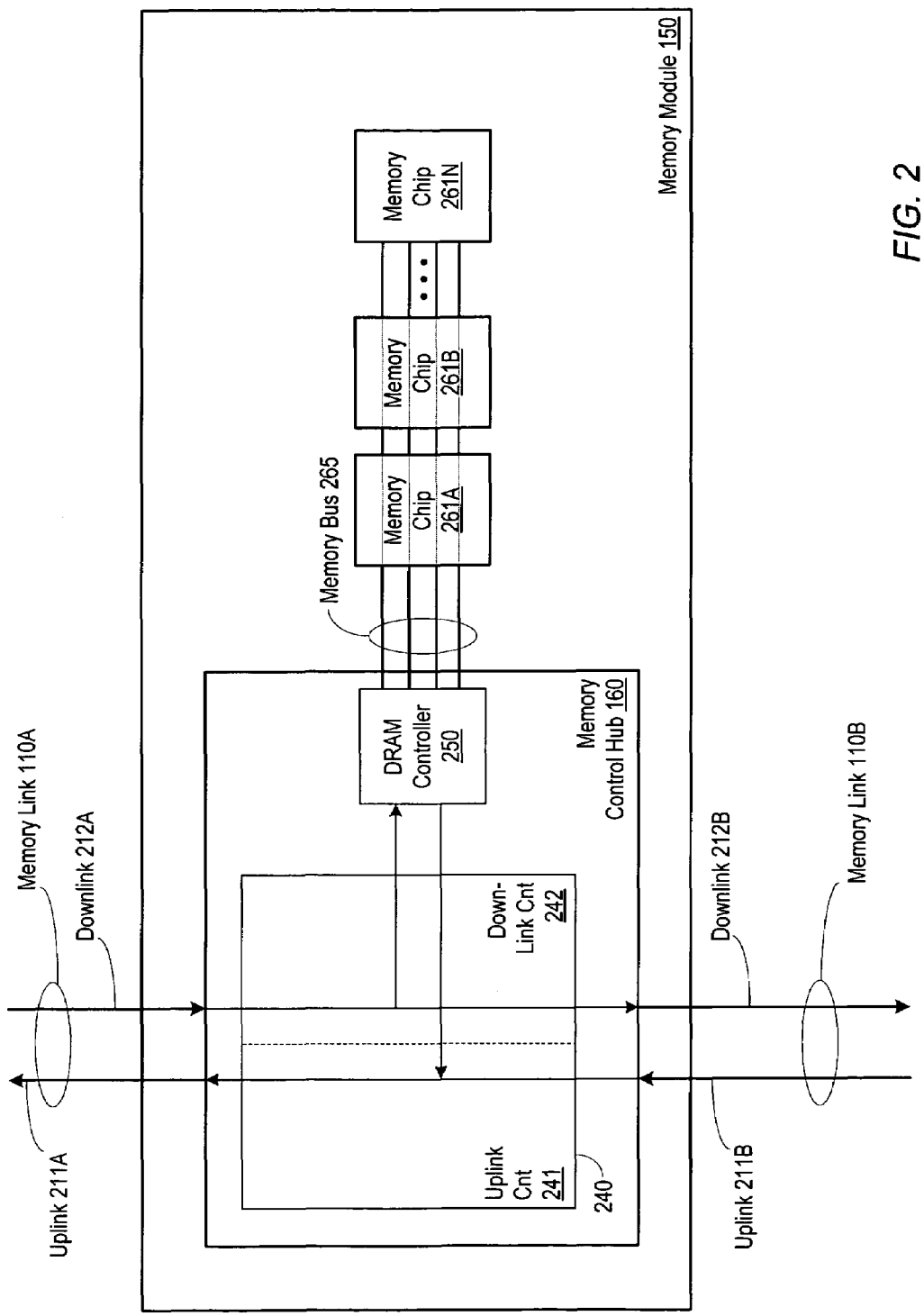
FIG. 2 is a block diagram of one embodiment of a memory module such as a memory module illustrated in FIG. 1.

Referring to FIG. 2, a block diagram of one embodiment of a memory module such as the memory module illustrated in FIG. 1 is shown. Components that correspond to those shown in FIG. 1 are numbered identically for clarity and simplicity. Memory module 150 includes a memory control hub 160 coupled to memory chips 261A through 261N via a memory bus 265. Memory control hub 160 includes a control unit 240 coupled to a DRAM controller 250. DRAM controller 250 is coupled to memory chips 261A–261N. Control unit 240 includes an uplink control 241 and a downlink control 242. As noted above, memory bus 265 may be any type of memory interconnect. In the illustrated embodiment, memory control hub 160 is coupled to a memory link 110A in an upstream direction and a memory link 110B in a downstream direction. It is further noted that the frequency of operation of memory bus 265 is independent of the frequency of operation of memory links 110.

In the illustrated embodiment, uplink control unit 241 may be configured to receive and forward packets received from another memory module downstream. The receiving and forwarding of the upstream packets creates an upstream transaction sequence. In addition, uplink control unit 241 may be configured to inject packets that originate within memory module 150 into the transaction stream.

In the illustrated embodiment, downlink control unit 242 may be configured to receive packets that originate at the host and if a memory module is connected downstream, to forward those packets to the downstream memory module. In addition, downlink control unit 242 may be configured to copy and decode the packets. In one embodiment, if the packets include an address that is within the range of addresses assigned to memory module 150 and the packet is a memory access request, downlink control unit 242 may pass the command associated with the packet to DRAM controller 250. In one embodiment, DRAM controller 250 is configured to initiate memory cycles to memory chips 261A–261N in response to memory commands from memory control hub 160. However, if the packet is not a memory request, but is instead a configuration packet, downlink control unit 242 may pass the configuration command associated with the packet to the core logic of control unit 240 (not shown) for processing. It is noted that in one embodiment, if the packet does not include an address that is within the range of addresses assigned to memory module 150, memory control hub 160 may drop or discard the packet if memory module 150 is the last memory module in the chain.

In one embodiment, memory control hub 160 is configured to receive a module present signal (not shown), which when activated by a downstream memory module, indicates to an upstream memory module that there is a downstream memory module present. In such an embodiment, if memory control hub 160 receives a transaction and no downstream memory module is determined to be present, memory control hub 160 may drop the transaction. In one specific implementation, when a given memory module 150 is inserted into a socket, the inserted memory module may apply a signal ground to the module present signal. Thus, an active module present signal is an active low signal.

It is noted that although the module present signal is active when a signal ground is applied in the embodiment described above, it is contemplated that in other embodiments, other voltage levels may be applied to the module present signal to indicate that a memory module is present.

Figure 3:
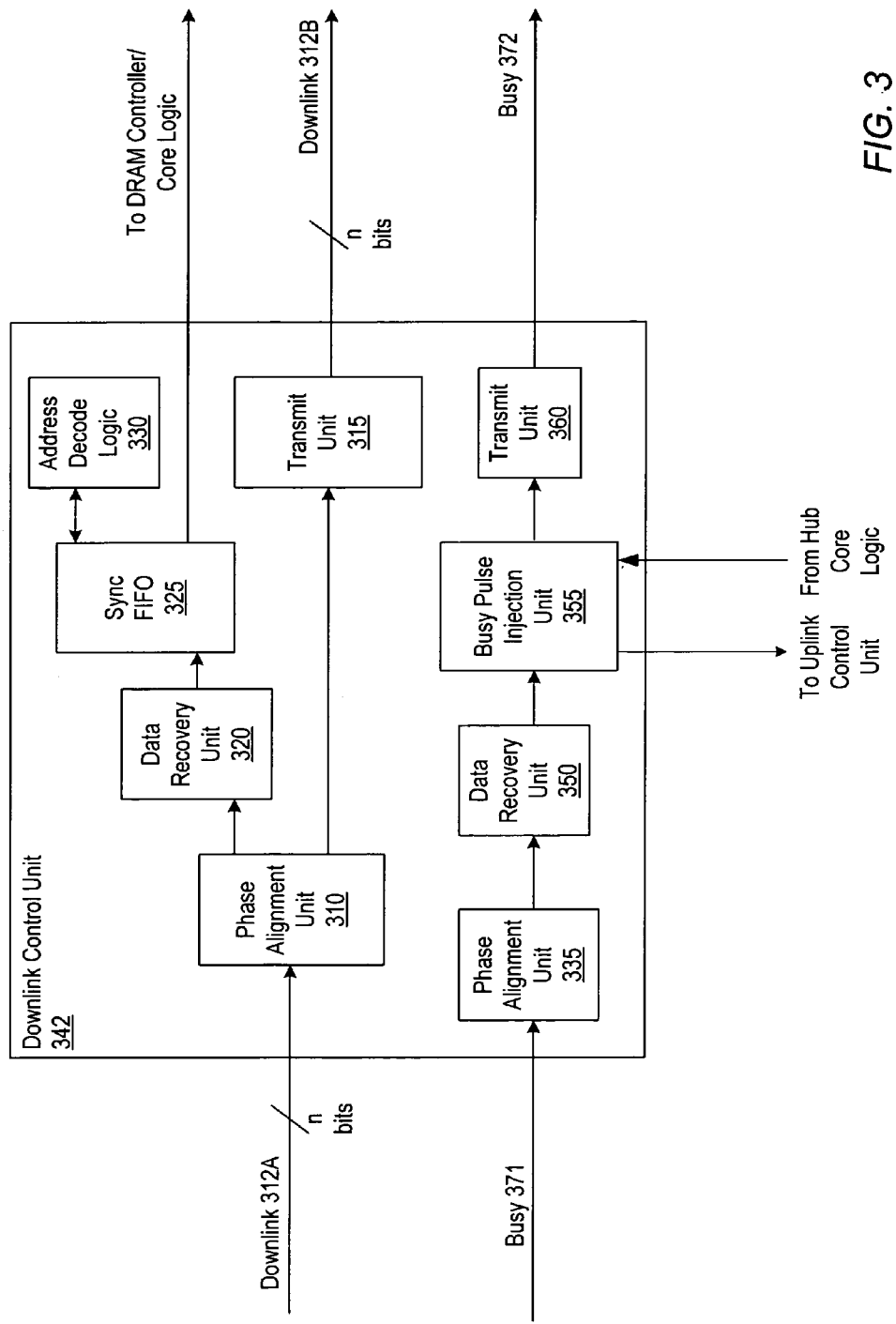
FIG. 3 is a block diagram of one embodiment of a downlink control unit such as the downlink control unit illustrated in FIG. 2.

Turning to FIG. 3, a block diagram of one embodiment of a downlink control unit is shown. In the embodiment illustrated in FIG. 3, downlink control unit 342 may be representative of the downlink control unit 242 illustrated in FIG. 2. Downlink control unit 342 is coupled to receive downstream transactions on downlink 312A and to transmit those downstream transactions on downlink 312B. In one embodiment, downlinks 312A and 312B may be representative of downlinks 212A and 212B of FIG. 2, respectively. It is noted that, as described above, downlink 312A and 312B include multiple bits. For example, in one implementation, downlinks 312A and 312B may each be 18-bit downlinks. In addition, downlink control unit 342 is configured to receive busy signal 371 from an upstream memory module or host 100 and to transmit busy signal 372 to a downstream memory module.

In the illustrated embodiment, downlink control unit 342 includes a phase alignment unit 310 which receives the incoming transactions. Phase alignment unit 310 is coupled to a transmit unit 315 and to a data recovery unit 320. Data recovery unit 320 is coupled to a synchronization first in first out buffer (FIFO) 325, which is coupled to address decode logic 330. In one embodiment, sync FIFO 325 is coupled to a DRAM controller such as DRAM controller 250 and to the core logic within control unit 240 of FIG. 2. It is noted that in the embodiment illustrated in FIG. 3, phase alignment unit 310, transmit unit 315 and data recovery unit 320 may operate on each bit of the downlink independently in a bit-wise manner. It is contemplated that in other embodiments, phase alignment unit 310, transmit unit 315 and data recovery unit 320 may operate on all the bits of the downlink at substantially the same time.

To provide the necessary memory bandwidth, it may be important for memory control hub 160 to efficiently forward received transactions to downstream memory modules. Accordingly, transactions received by downlink control unit 342 are blindly forwarded downstream. In one embodiment, each received bit is phase aligned by phase alignment unit 310 and sent to transmit unit 315, without decoding, for transmission on downlink 312B. In addition, each received bit is sent to data recovery unit 320 for processing.

In one embodiment, phase alignment unit 310 is configured to, for each bit, dynamically adjust the phase of the local sampling clock to allow downlink control unit 342 to sample in the middle of the received data eye. For example, in one embodiment, a reference clock is provided from the host to a phase locked loop (PLL) (not shown) within each memory control hub 160. The PLL generates the local sampling clock as well as the transmit clock within downlink control unit 342. Phase alignment unit 310 is configured to track the average phase of the incoming data stream. Phase alignment unit 310 may also be configured to compensate for static skew caused by processing variations and to track low frequency variations of data phase caused by voltage and temperature variations and to compensate for any low frequency phase jitter that may be on the reference clock and not tracked by the hub's PLL. Phase alignment unit 310 filters the high frequency jitter caused by inter-symbol interference, cross-talk or reflective noise and high frequency phase noise that may be generated by the transmitter.

To facilitate phase alignment of the local sampling clock, it may be necessary to provide a sufficient number of transitions (or transmission density) on each bit of downlink 312A. In one embodiment, the transition density is provided by scrambling the data transmitted on each bit and then de-scrambling the received data upon receipt. In one embodiment, the data is scrambled by Exclusive-ORing (XOR) the data with a pseudo random binary sequence (PRBS). A linear feedback shift register (LFSR) may generate the PRBS using a given seed polynomial. In another embodiment, the transition density may be provided by sending synchronization packets that have predetermined data payloads. In such an embodiment, the predetermined data payloads may include a random or pseudo-random pattern that has a sufficient number of transitions.

Regardless of the way in which the transition density is obtained, data recovery unit 320 is configured to recover the data bits. In embodiments that use scrambling, data recovery unit 320 may be configured to de-scramble the received data using the same PRBS as that used to scramble the data. Conversely, in embodiments that use synchronization packets to obtain the transition density, data recovery unit 320 may simply drop or discard the synchronization packet data once phase alignment unit 310 has finished aligning the local sampling clock.

In the illustrated embodiment, sync FIFO 325 is configured to store the incoming data bits for use by the core logic of control unit 240. For example, since the transactions are sent in packetized fashion, the received bits may be stored in sync FIFO 325 and re-formatted for decoding. The received packets are then decoded by address decode logic 330. As noted above, each memory module 150 may be assigned a range of memory addresses. In addition, each memory control hub 160 may be assigned a hub address for use in configuration transactions. If a transaction address is decoded and a match is indicated, the command information may be extracted and processed. In one embodiment, if the transaction is a memory access request having an address that matches a memory address associated with memory control hub 160, the decoded command may be sent to DRAM controller 250. If the transaction is a configuration transaction, the decoded command may be sent to the core logic of control unit 240. In addition, if address decode logic 330 does not detect a match, the packet may be discarded or dropped.

In the illustrated embodiment, phase alignment unit 335 is coupled to receive the incoming busy signal 371. Phase alignment unit 335 is also coupled to data recovery unit 350, which is in turn coupled to busy pulse injection unit 355. Busy pulse injection unit 355 is coupled to transmit unit 360.

In the illustrated embodiment, phase alignment unit 335 and data recovery unit 350 operate similar to phase alignment unit 310 and data recovery unit 320, respectively. However, in one embodiment, busy signal 371 is a single bit differential signal and not a multi-bit signal. Busy signal 371 and busy signal 372 are used to ensure that hubs near the bottom of the serial chain of memory modules will leave enough idle time for hubs near the top of the serial chain to inject packets. In one embodiment, busy signal 371 includes an indication of the number of packets that will be injected into the upstream transaction sequence by all memory modules that are upstream. Accordingly, busy signal 372 is includes an indication of the total number of packets that will be injected into the upstream transaction sequence by all memory modules that are upstream and the number of packets that will be injected locally by memory control hub 160.

In one embodiment, busy pulse injection unit 355 is configured to receive data corresponding to the number of packets that will be injected into the upstream transaction sequence by all memory modules that are upstream. In addition, busy pulse injection unit 355 is configured to receive an indication from the core logic of control unit 240 corresponding to the number of packets that will be injected into the upstream transaction sequence locally by memory control hub 160. Accordingly, busy pulse injection unit 355 is configured to create busy signal 372. In one embodiment, busy signals 371 and 372 may include a pulse for each injected packet. Thus, a signal such as busy signal 372 that is indicative of five packets being injected would include five pulses, for example. However it is contemplated that in other embodiments, any number of pulses may be included for each injected packet. As will be described further below, packets may be sent as short packets or long packets. Accordingly, in one embodiment, for an injected long packet, busy pulse injection unit 355 may include two pulses for each long packet.

In addition, busy pulse injection unit 355 is configured to provide an indication corresponding to the number of busy pulses received from upstream to uplink control unit 241 of FIG. 2. In one embodiment, if a memory module is the last module in the serially connected chain, uplink control unit 241 may cause one or more NOP packets to be injected into the upstream transaction sequence dependent upon the number of busy pulses received on busy signal 371. For example, in one implementation, for every two busy pulses received, uplink control unit 241 may cause one NOP packet to be injected into the upstream transaction sequence. However, other embodiments are contemplated in which other ratios of NOP packets to received busy pulses may be used.

In the illustrated embodiment, transmit unit 360 is configured to receive the busy signal from busy pulse injection unit 355. In one embodiment, transmit unit 360 is further configured to scramble the data, as described above, using an LFSR prior to transmitting busy signal 372. Alternatively, transmit unit 360 may inject synchronization packets as described above.

Figure 4:
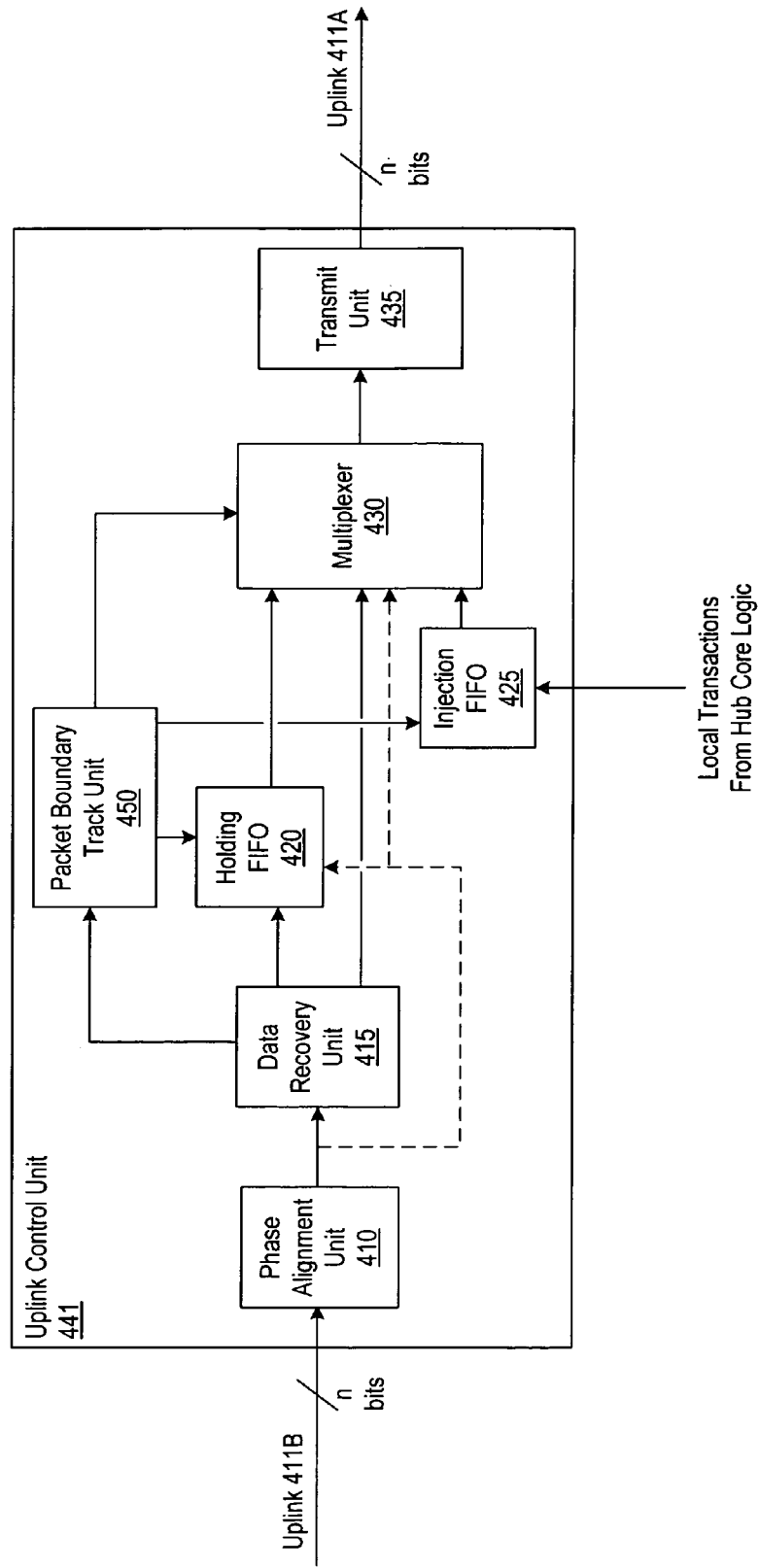
FIG. 4 is a block diagram of one embodiment of an uplink control unit such as the uplink control unit illustrated in FIG. 2.

Referring to FIG. 4, a block diagram of one embodiment of an uplink control unit is shown. In the embodiment illustrated in FIG. 4, uplink control unit 441 may be representative of the uplink control unit 241 illustrated in FIG. 2. Uplink control unit 441 is coupled to receive upstream transactions on uplink 411B and to transmit upstream transactions on uplink 411A. In addition, uplink control unit 241 is configured to inject packets into the upstream transaction sequence received on uplink 411B. In one embodiment, uplinks 411A and 411B may be representative of uplinks 211A and 211B of FIG. 2, respectively. It is noted that, as described above, uplink 411A and 411B include multiple bits. For example, in one implementation, uplinks 411A and 411B may each be 16-bit uplinks.

In the illustrated embodiment, uplink control unit 441 includes a phase alignment unit 410 which receives the incoming upstream transactions. Phase alignment unit 410 is coupled to a data recovery unit 415.

To provide the necessary memory bandwidth, it may be important for memory control hub 160 to efficiently forward received upstream transactions to upstream memory modules or to the host. Similar to downstream control unit 342, transactions received by uplink control unit 441 are forwarded upstream. However, in contrast to downstream control unit 342, uplink control unit 441 may inject locally generated packets into the upstream transaction sequence.

In the illustrated embodiment, phase alignment unit 410 operates similar to phase alignment unit 310. Accordingly, phase alignment unit 410 is configured to, for each bit, dynamically adjust the phase of the local sampling clock to allow uplink control unit 441 to sample in the middle of the received data eye as described above. Similarly, data recovery unit 415 is configured to recover the data bits as described above in conjunction with the description of data recovery unit 320.

In the illustrated embodiment, data recovery unit 415 is coupled to multiplexer 430, which is coupled to transmit unit 435. If uplink control unit 441 has no packets to inject into the upstream transaction sequence, uplink control unit 441 is configured to forward received transactions on uplink 411A. In one embodiment, packet boundary track unit 450 may provide control signals to multiplexer 430 that may allow the received transactions to be scrambled and transmitted by transmit unit 435. In one embodiment, transmit unit 435 may scramble the data to be transmitted using an LFSR as described above, while in other embodiments, transmit unit 435 may inject synchronization packets as described above.

However, in one embodiment, as packets to be injected are received and stored within injection FIFO 425 from hub core logic, the received data from data recovery unit 415 is stored within holding FIFO 420 for later transmission. When the transmission of the current forwarded packet is complete, data stored within injection FIFO 425 is provided to an input of multiplexer 430. In addition, packet boundary track unit 450 tracks the packet boundaries of packets received from uplink 411B. Packet boundary track unit 450 ensures that the injected packets do not collide with the forwarded packets by providing control signals to multiplexer 430 at the correct time; thereby allowing the waiting packet to be injected to be scrambled and transmitted by transmit unit 435. Assuming that there are packets to be injected stored within injection FIFO 425 and packets to be forwarded stored within holding FIFO 420, packet boundary track unit 450 may selectively control multiplexer 430 to pass either type of packet to transmit unit 435 depending upon a fairness algorithm. The famess algorithm may be any algorithm configured to prevent starvation of either the injected packets or the forwarded packets for any given memory module. It is noted that NOP packets received on uplink 411B may be discarded instead of being stored within holding FIFO 420 or being forwarded.

It is noted that in an alternative embodiment, to facilitate improved latency for forwarded transaction traffic, phase alignment unit 410 may be coupled to holding FIFO 420 and to multiplexer 430, as indicated by the dashed lines. Such an embodiment may provide improved latency when no injected traffic is present.

The Memory Interconnect

Referring collectively to FIG. 1 and FIG. 2, the memory interconnect includes one or more high-speed point-to-point memory links such as memory links 110A–110C each including an uplink such as uplink 211A and a downlink such as downlink 212A, for example. As noted above, in one embodiment downlinks may be 18-bit links while uplinks may be 16-bit links. As such, an 18-bit downlink may include 16 control, address and data (CAD) signals, a busy signal and a Control (CTL) signal. A given uplink may include 16 control, address and data (CAD) signals. It is contemplated however, that in an alternative embodiment, an uplink such as uplink 211A may also include a CTL signal.

In addition to the high-speed links, other signals may be provided to each memory module 150. For example, in one embodiment, a reset signal, a power OK signal and a reference clock may be provided to each memory module 150 from host 100. Further, other signals may be provided between each memory module. For example, as described above, a next memory module present signal may be provided between memory modules.

Generally speaking, the types of transactions conveyed on memory links 110 may be categorized into configuration and control transactions and memory transactions. In one embodiment, configuration and control transactions may be used to configure memory control hub 160. For example, configuration and control transactions may be used to access configuration registers, assign a memory address range to a memory module or to assign a hub address to a memory control hub. Memory transactions may be used to access the memory locations within memory chips 261A–261N.

Accordingly, in one embodiment, there are two types of addressing supported: hub addressing and memory addressing. Using hub addressing, eight hub bits identify the specific memory control hub being accessed. In one embodiment, a hub address of FFh may be indicative of a broadcast to all memory control hubs. Using memory addressing, each hub decodes the upper portion of the address bits to determine which hub should accept the request and the lower portion to determine the memory location to be accessed. In one embodiment, there are 40 address bits, although it is contemplated that other numbers of address bits may be used as desired.

In one embodiment, each of the memory links is configured to convey the transactions using one or more packets. The packets include control and configuration packets and memory access packets, each of which may include a data payload depending on the type of command the packet carries. As such, the sets of wires that make up memory links 110 may be used to convey control, address and data.

The packets may be generally characterized by the following: Each packet includes a number of bit positions which convey a single bit of information. Each packet is divided into several bit times and during a given bit time, all of the bit positions of the packet are sampled. As such, the control information and data share the same wires of a given link (e.g., CAD wires). As will be described in greater detail below, in one embodiment, packets are multiples of bit pairs and the first bit-time of every packet is sampled at an even bit-time. Packets begin with a control header that may be either one or two bit-pairs in length. In one embodiment, the first five bits of the control header is the command code. Table 1 below illustrates the various types of packets and their associated command codes. It is noted however, that the actual codes shown in column one are for illustrative purposes and that other codes may be used for each given command.

TABLE 1

Packet types and command codes

| Code | Header Length (bit-times) | Command | Description | Direction | Normal Response | Address Type |
|---|---|---|---|---|---|---|
| 00h | — | NOP | Null Operation/Idle State | Both | — | — |
| 04h | 2 | AddrSet | Address Set | Down | AddrAck | Hub |
| 05h | 2 | AddrAck | Address Acknowledge | Up | — | — |
| 06h | 2 | Ack | Acknowledge | Up | — | — |
| 07h | 2 | Nak | Not Acknowledge/Error | Up | — | — |
| 08h | 2 | SRdResp | Short Read Response | Up | — | — |
| 09h | 2 | LRdResp | Long Read Response | Up | — | — |
| 0Ah | 2 | ConfigRd | Configuration Read | Down | RdResp | Hub |
| 0Ch | 2 | ConfigWr | Configuration Write | Down | Ack | Hub |
| 0Eh | 2 | DIMMCtl | DIMM Control | Down | Ack | Hub |

TABLE 1-continued

Packet types and command codes

| Code | Header Length (bit-times) | Command | Description | Direction | Normal Response | Address Type |
|---|---|---|---|---|---|---|
| 10h | 4 | SMemRd | Short Memory Read | Down | RdResp/Ack | Memory |
| 11h | 4 | LMemRd | Long Memory Read | Down | RdResp | Memory |
| 12h | 4 | BlkMemWr | Block Memory Write | Down | Ack | Memory |
| 13h | 4 | SbytMemWr | Short Byte Memory Write | Down | Ack | Memory |
| 14h | 4 | LbytMemWr | Long Byte Memory Write | Down | Ack | Memory |

Hub Initialization

Prior to communication between host 100 and each memory control hub 160 of each memory module 150, an initialization sequence may be performed to synchronize any scramble/de-scramble logic, sync FIFOs, and phase alignment logic that may be present within host 100 and each memory control hub 160.

Figure 5:
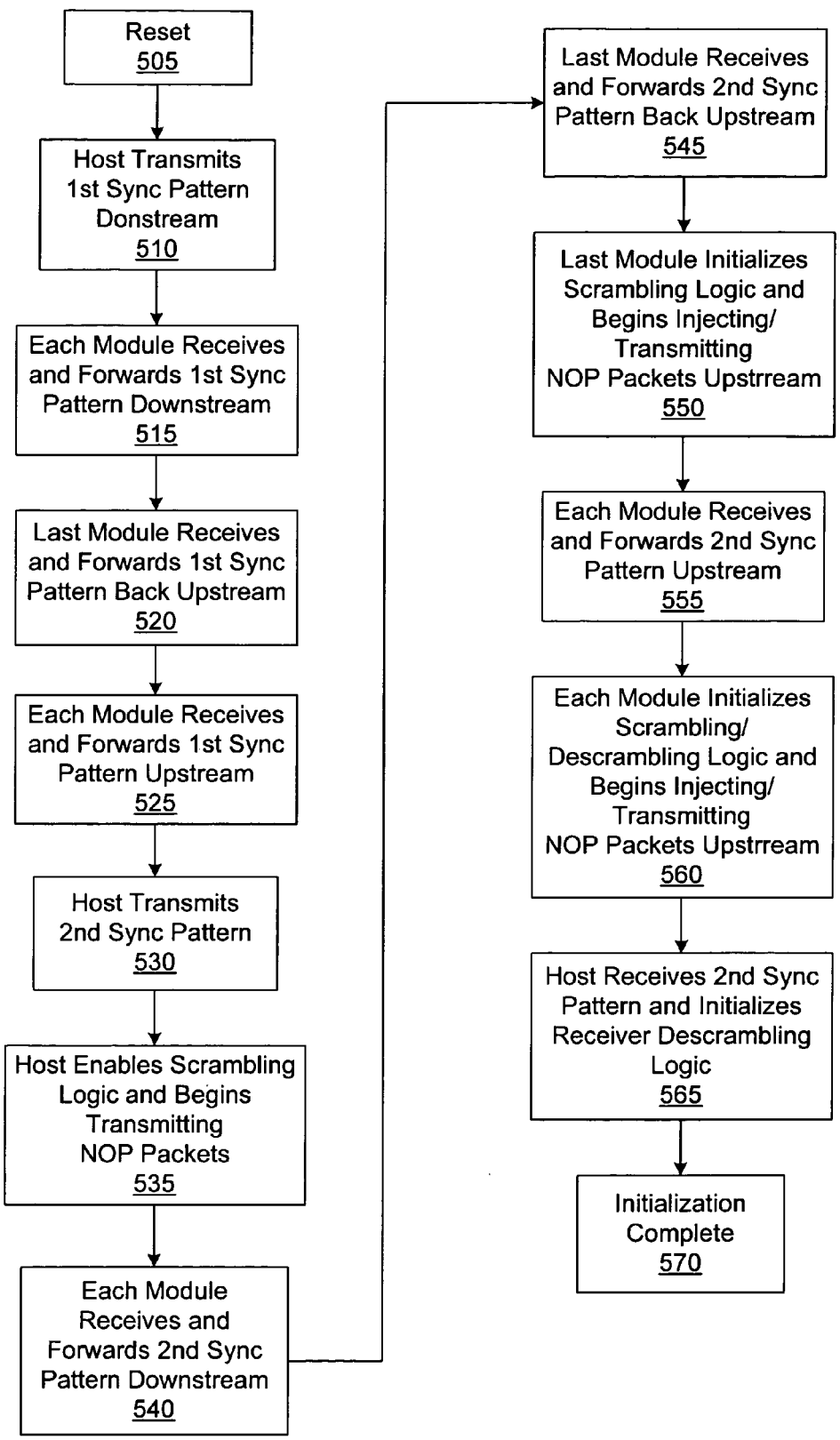
FIG. 5 is a flow diagram describing the initialization of one embodiment of the system including the serially connected chain of memory modules of FIG. 1.

FIG. 5 is a flow diagram describing the operation of one embodiment of the system during a hub initialization sequence. Referring collectively to FIG. 1 through FIG. 5, in response to a reset condition (block 505), host 100 begins transmitting a first synchronization pattern downstream on a downlink of the memory interconnect (block 510). For example, the first synchronization pattern may be sent downstream on all bits of the memory link 110A of FIG. 1. In such an embodiment, all 18 bits of the downlink including 16 CAD bits, one CTL bit, and one busy bit may be used to transmit the first synchronization pattern. In one embodiment, the first synchronization pattern may be a pattern with a decreasing number of transitions. For example, the pattern 1010101010101011001100110011001111100000111100 001111111100000000 is illustrative of a first synchronization pattern. Alternatively, the first synchronization pattern may be a pseudo-random sequence generated using a linear feedback shift register, for example. However, is noted that in other embodiments, other synchronization patterns may be used.

As the downlink control unit 342 within memory module hub 160 of each memory module receives the first synchronization pattern, the phase alignment units (e.g., 310 and 335) lock onto the first synchronization pattern. In addition, each memory control hub 160 forwards the first synchronization pattern downstream to the next memory module in the chain (block 515). When the last memory module in the chain receives and locks onto the first synchronization pattern, the memory control hub 160 within the last memory module forwards the first synchronization pattern back upstream (block 520). In one embodiment, the first synchronization pattern may be sent upstream on 16 CAD bits, although in other embodiments, additional bits may be used.

As the uplink control unit 441 within memory module hub 160 of each memory module receives the first synchronization pattern, the phase alignment unit (e.g., 410) locks onto the first synchronization pattern. In addition, each memory control hub 160 forwards the first synchronization pattern upstream to the next memory module in the chain (block 525). However, prior to forwarding the first synchronization pattern upstream, uplink control unit 441 may selectively delay forwarding the first synchronization pattern long enough to allow phase alignment unit 410 to lock onto the first synchronization pattern. In one implementation, phase alignment unit 410 may provide an enable/disable signal (not shown) to transmit unit 435. In such an implementation, phase alignment unit 410 may enable transmit unit 435 once it has locked onto the first synchronization pattern and initialized any internal logic. When the upstream receive logic within host 100 receives the first synchronization pattern, host 100 begins sending a second synchronization pattern downstream (block 530). In one embodiment, the second synchronization pattern may be the inverse of the first synchronization pattern. However, other patterns may be used. Similar to the first synchronization pattern above, the second synchronization pattern may be sent on all 18 bits of the downlink (e.g., memory link 110A). Once the second synchronization pattern is sent, host 100 enables its scramble logic (not shown) and begins sending NOP packets downstream (block 535). It is further noted that the selection of the pattern may be determined by how fast phase alignment and units (e.g., 210 and 410) may be required to lock on to the patterns and how much drift may be tolerated.

As the downlink control unit 342 within memory module hub 160 of each memory module receives the second synchronization pattern, the phase alignment units (e.g., 310 and 335) lock onto the second synchronization pattern. In addition, each memory control hub 160 initializes its downstream de-scrambling logic within data recovery unit 320 and forwards the second synchronization pattern downstream to the next memory module in the chain (block 540). When the last memory module in the chain receives and locks onto the second synchronization pattern, the memory control hub 160 within the last memory module its downstream de-scrambling logic within data recovery unit 320 and forwards the second synchronization pattern back upstream (block 545). In addition, once the second synchronization pattern is sent upstream, the last memory module initializes its upstream scramble logic within transmit unit 435 and begins injecting and transmitting NOP packets upstream (block 550).

As the uplink control unit 441 within memory module hub 160 of each memory module receives the second synchronization pattern, the phase alignment unit (e.g., 410) locks onto the second synchronization pattern. In response to locking onto the second synchronization pattern, each memory control hub 160 forwards the second synchronization pattern upstream to the next memory module in the chain (block 555). In addition, once the second synchronization pattern is sent upstream, each memory module initializes its downstream de-scrambling logic within data recovery unit 320, its scramble logic within transmit units 315 and 360, upstream de-scrambling logic within data recovery unit 415, and its upstream scramble logic within transmit unit 435 and begins injecting and transmitting NOP packets upstream (block 560).

In response to receive logic (not shown) within host 100 receiving and locking onto the second synchronization pattern, host 100 initializes its receiver de-scramble logic (not shown) to enable it to begin receiving packets (block 565). The initialization sequence is now complete (block 565) and host 100 and each memory module 150 in the serial chain is initialized and ready to receive and transmit packets as described above.

It is noted that the first synchronization pattern and the second synchronization pattern may include encodings. For example, in one embodiment in one or more bits at the end of either pattern or both may include encodings that define bit lane numbering or the size of the link.

Figure 6:
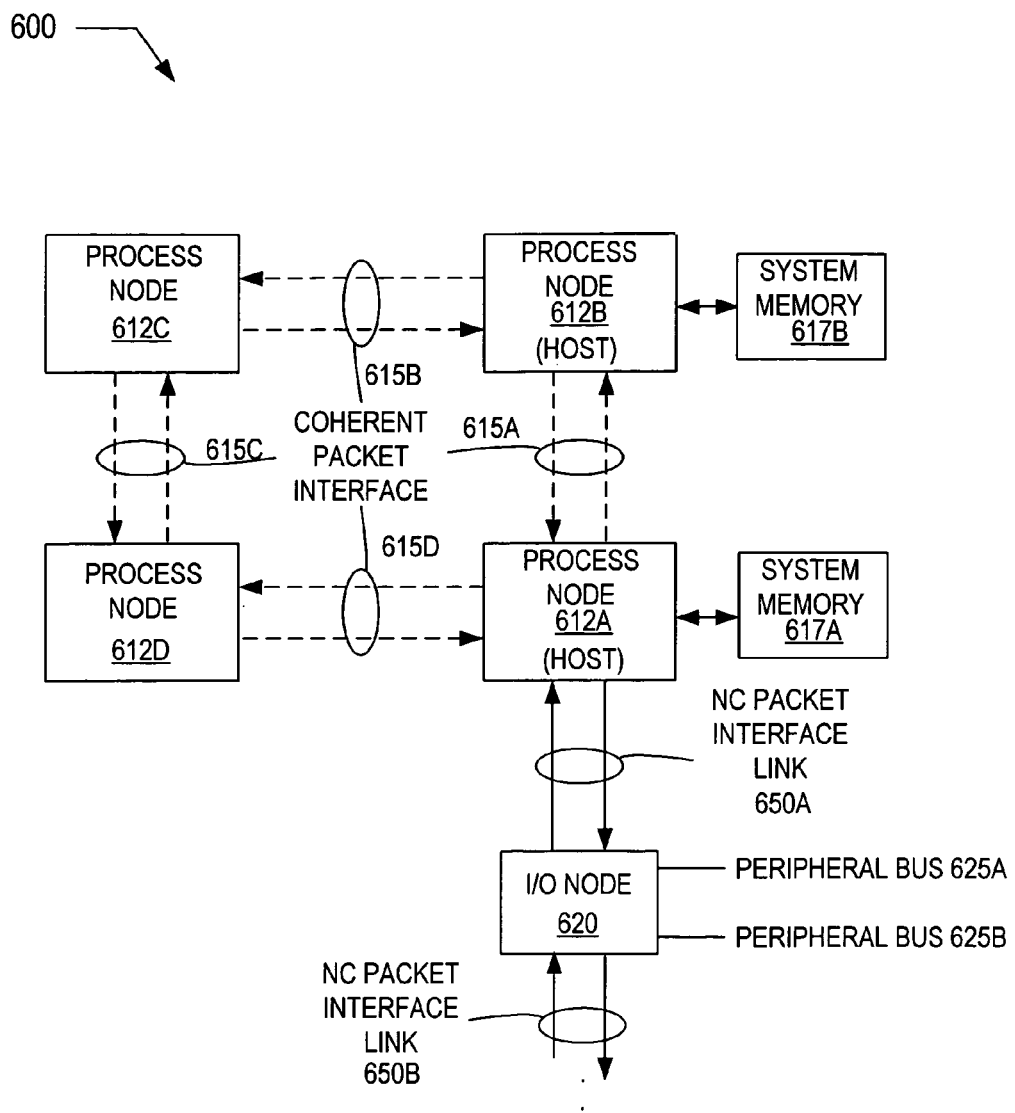
FIG. 6 is a block diagram of one embodiment of a computer system.

FIG. 6 is a block diagram of one embodiment of a computer system. Computer system 600 includes process nodes 612A–612D each interconnected by coherent packet interface links 615A–D. Each link of coherent packet interface 615 may form a high-speed point-to-point link. Process nodes 612A–D may each include one or more processors. Computer system 600 also includes an I/O node 620 which is coupled to process node 612A via a non-coherent packet interface 650A. I/O node 620 may be connected to another I/O node (not shown) in a chain topology for example, by non-coherent packet interface 650B. Process nodes 612A is illustrated as a host node and may include a host bridge for communicating with I/O node 620 via NC packet interface 650A. Process nodes 612B–D may also include host bridges for communication with other I/O nodes (not shown). The non-coherent packet interface links formed by NC packet interface 650A–B may also be referred to as point-to-point links. I/O node 620 is connected to a pair of peripheral buses 625A–B.

FIG. 6 further illustrates respective system memories (e.g., 617A and 617B) coupled to process nodes 612A and 612B. In the illustrated embodiment, process node 612A and 612B are each illustrative of a host as shown in FIG. 1, and each system memory 617 may be implemented in the configuration described in conjunction with the description of FIG. 1 and FIG. 2 above. Further, the interconnects between each of process nodes 612A and 612B and their respective system memories 617 may be reflective of the memory interconnect including memory link 110C described above in FIG. 1 and FIG. 2. It is noted that in other embodiments, other numbers of process nodes may be used. Further, it is contemplated that each of process nodes 612C and 612D may be similarly connected to a respective system memory such as system memory 617, for example.

In the illustrated embodiment, each link of coherent packet interface 615 is implemented as sets of unidirectional lines (e.g. lines 615A are used to transmit packets from processing node 612A to processing node 612B and lines 615B are used to transmit packets from processing node 612B to processing node 612C). Other sets of lines 615C–D are used to transmit packets between other processing nodes as illustrated in FIG. 1. The coherent packet interface 615 may be operated in a cache coherent fashion for communication between processing nodes ("the coherent link"). Further, non-coherent packet interface 650 may be operated in a non-coherent fashion for communication between I/O nodes and between I/O nodes and a host bridge such as the host bridge of process node 612A ("the non-coherent link"). The interconnection of two or more nodes via coherent links may be referred to as a "coherent fabric". Similarly, the interconnection of two or more nodes via non-coherent links may be referred to as a "non-coherent fabric". It is noted that a packet to be transmitted from one processing node to another may pass through one or more intermediate nodes.

For example, a packet transmitted by processing node 612A to processing node 612C may pass through either processing node 612B or processing node 612D as shown in FIG. 6. Any suitable routing algorithm may be used. Other embodiments of computer system 600 may include more or fewer processing nodes than the embodiment shown in FIG. 6.

One example of a packet interface such as non-coherent packet interface 650 may be compatible with HyperTransport™ technology. Peripheral buses 625A and 625B are illustrative of a common peripheral bus such as a peripheral component interconnect (PCI) bus. It is understood, however, that other types of buses may be used.

It is further noted that other computer system configurations are possible and contemplated. For example, it is contemplated that the system memory configuration described above in FIG. 1 through FIG. 5 may be used in conjunction with a computer system employing a processor chipset that includes a Northbridge. In such an embodiment, a memory controller within the Northbridge may serve as the host.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of initializing a system including a host coupled to a serially connected chain of memory modules, said method comprising:
   said host transmitting a first synchronization pattern and a second synchronization pattern downstream in response to a reset condition;
   each memory module in said serially connected chain of memory modules receiving and forwarding said first and said second synchronization pattern;
   said host transmitting a plurality of NOP packets downstream in response to transmitting said second synchronization pattern; and
   a portion of said memory modules in said serially connected chain of memory modules injecting and transmitting NOP packets upstream in response to receiving said second synchronization pattern from downstream.

2. The method as recited in claim 1, further comprising each memory module in said serially connected chain of memory modules locking onto said first and said second synchronization pattern.

3. The method as recited in claim 1, further comprising each memory module in said serially connected chain of memory modules initializing internal scrambling and de-scrambling logic using said first and said second synchronization pattern.

4. The method as recited in claim 1, further comprising each memory module in said serially connected chain of memory modules enabling de-scrambling logic in response to locking onto said second synchronization pattern.

5. The method as recited in claim 1, further comprising each memory module excepting a last memory module in said serially connected chain of memory modules forwarding said first and said second synchronization pattern downstream via a downlink.

6. The method as recited in claim 1, further comprising each memory module in said serially connected chain of memory modules forwarding said first and said second synchronization pattern upstream via an uplink.

7. The method as recited in claim 6, further comprising each memory module in said serially connected chain of memory modules selectively delaying forwarding said first synchronization pattern upstream until each memory module locks onto said first synchronization pattern.

8. The method as recited in claim 1, further comprising each memory module in said serially connected chain of memory modules enabling scrambling logic prior to said transmitting NOP packets upstream.

9. The method as recited in claim 1, wherein a last memory module in said serially connected chain of memory modules receiving said first and said second synchronization pattern via a downlink and forwarding said first and said second synchronization pattern upstream via an uplink.

10. A system comprising:
- a host configured to transmit a first synchronization pattern and a second synchronization pattern downstream in response to a reset condition;
- a serially connected chain of memory modules coupled to said host, wherein each memory module in said serially connected chain of memory modules is configured to receive and forward said first and said second synchronization pattern;
- wherein said host is further configured to transmit a plurality of NOP packets downstream in response to transmitting said second synchronization pattern; and
- wherein a portion of said memory modules in said serially connected chain of memory modules is configured to inject and transmit NOP packets upstream in response to receiving said second synchronization pattern from downstream.

11. The system as recited in claim 10, wherein each memory module in said serially connected chain of memory modules is configured to lock onto said first and said second synchronization pattern.

12. The system as recited in claim 10, wherein each memory module in said serially connected chain of memory modules is configured to initialize internal scrambling and de-scrambling logic using said first and said second synchronization pattern.

13. The system as recited in claim 10, wherein each memory module in said serially connected chain of memory modules is configured to enable de-scrambling logic in response to locking onto said second synchronization pattern.

14. The system as recited in claim 10, wherein each memory module excepting a last memory module in said serially connected chain of memory modules is configured to forward said first and said second synchronization pattern downstream via a downlink.

15. The system as recited in claim 10, wherein each memory module in said serially connected chain of memory modules is configured to forward said first and said second synchronization pattern upstream via an uplink.

16. The system as recited in claim 15, wherein each memory module in said serially connected chain of memory modules is further configured to selectively delay forwarding said first synchronization pattern upstream until each memory module locks onto said first synchronization pattern.

17. The system as recited in claim 10, wherein each memory module in said serially connected chain of memory modules is configured to enable scrambling logic prior to transmitting said NOP packets upstream.

18. The system as recited in claim 10, wherein a last memory module in said serially connected chain of memory modules is configured to receive said first and said second synchronization pattern via a downlink and to forward said first and said second synchronization pattern upstream via an uplink.

19. A memory module comprising:
- a plurality of memory chips; and
- a memory control hub coupled to control access to said plurality of memory chips, wherein said memory control hub is configured to receive a first and a second synchronization pattern originating at a host via a first downlink and to transmit said first and a second synchronization pattern via a second downlink;
- wherein said memory control hub is further configured to receive said first and said second synchronization pattern via a first uplink and to transmit said first and said second synchronization pattern via a second uplink; and
- wherein said memory control hub is further configured to inject and transmit NOP packets via said second uplink in response to receiving said second synchronization pattern via said first uplink.

20. The memory module as recited in claim 19, wherein said memory control hub is further configured to initialize scrambling and de-scrambling logic using said first and said second synchronization pattern.

21. The memory module as recited in claim 19, wherein said memory control hub is further configured to enable de-scrambling logic in response to locking onto said second synchronization pattern received via said first downlink.

22. The memory module as recited in claim 19, wherein each memory module in said serially connected chain of memory modules is configured to enable scrambling logic in response to locking onto said second synchronization pattern received via said first uplink and prior to transmitting said NOP packets upstream.

* * * * *